No. 648,452. Patented May 1, 1900.
N. A. BIBIKOV.
APPARATUS FOR EXTINGUISHING FIRES.
(Application filed Jan. 26, 1899.)
(No Model.)

Witnesses:

Inventor
Nicholas A. Bibikov
By George Haseltine
Attorney

UNITED STATES PATENT OFFICE.

NICHOLAS A. BIBIKOV, OF NEW YORK, N. Y.

APPARATUS FOR EXTINGUISHING FIRES.

SPECIFICATION forming part of Letters Patent No. 648,452, dated May 1, 1900.

Application filed January 26, 1899. Serial No. 703,414. (No model.)

*To all whom it may concern:*

Be it known that I, NICHOLAS A. BIBIKOV, chemist, a citizen of the United States, residing in New York, (Brooklyn,) in the county of Kings and State of New York, have invented certain new and useful Improvements in Apparatus for Extinguishing Fires, of which the following is a specification.

The object of my invention is to supply the means of extinguishing fire, especially in the holds of vessels when filled with bale-cotton or other merchandise. This is done safely and promptly without injury to the cotton or to the vessel. The danger of ignition in transporting cotton by spontaneous combustion or otherwise is well known. The losses to the owners of the cotton and insurance companies have been serious, as heretofore the cotton not destroyed by such fires has been greatly damaged by the water usually used as an extinguisher. I attain this object by the use of nitrogen gas generated by the method hereinafter explained and by means of the novel apparatus illustrated in the accompanying drawings, in which—

Figure 1:
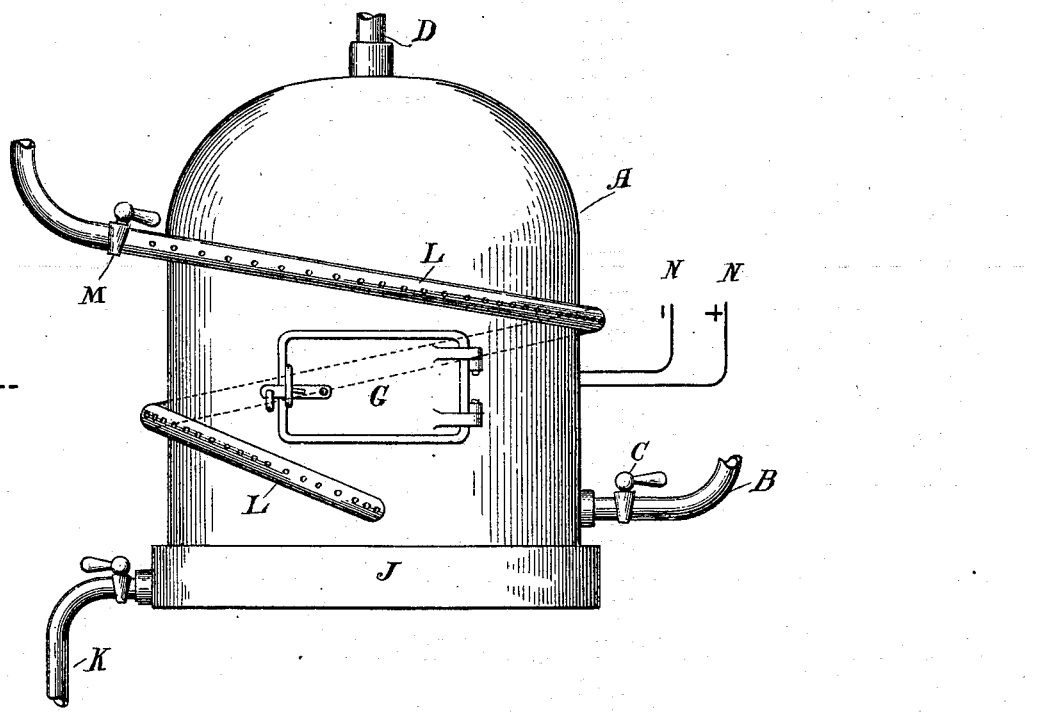
Figure 2:
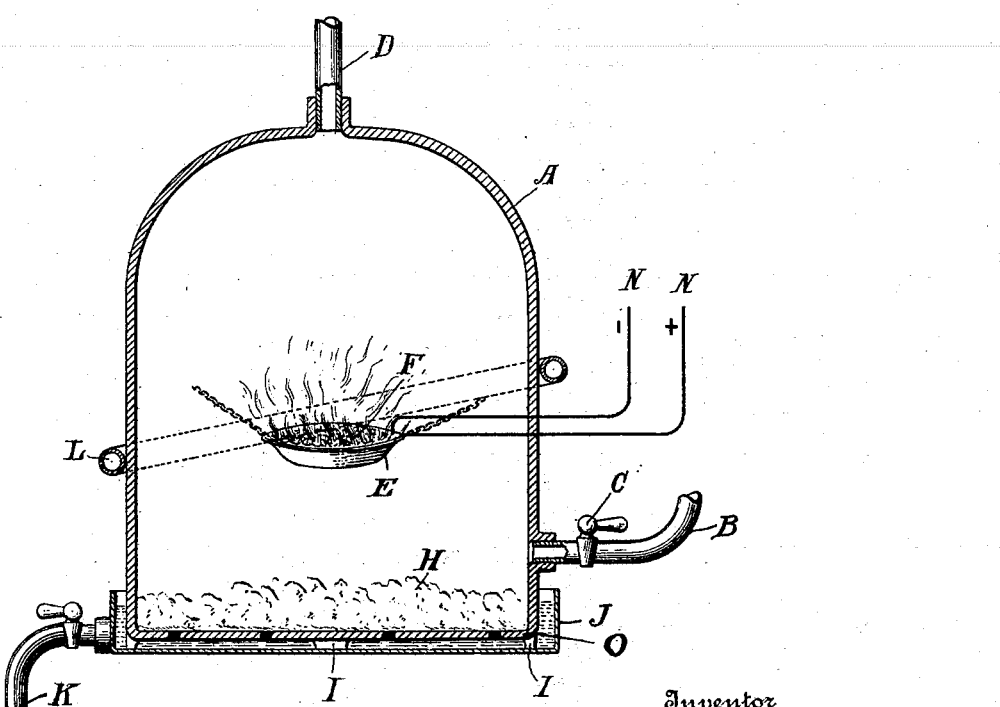

Figure 1 is a front elevation, and Fig. 2 a central vertical section, of the apparatus.

A is a chamber of any convenient shape and constructed of any suitable material, on one side of which chamber is an inlet air-pipe B. The amount of air admitted into the chamber through this pipe is regulated by valve C. An aperture is formed in the top of chamber A, in which is inserted a tube D.

Within chamber A is placed a receptacle E to contain phosphorus F, which receptacle is fastened by chains securely to the sides of said chamber, which is provided with a door G, and in the lower part of this chamber, upon the perforated bottom O, are placed layers of sponges, asbestos, or of mineral wool H. The chamber A rests on supports I in a tank J, having on one side a waste-pipe K. The pipe L, connected with a reservoir of water, is closed at its lower end and perforated in the portion that encircles the chamber A. The supply of water through this pipe is regulated by a valve M.

N N are electric wires supplied at the end where they come in contact with the phosphorus F with a suitable device for igniting the phosphorus as soon as the electric contact is made.

The apparatus is preferably set in the lower part of the hold of the vessel in which the baled cotton or other merchandise is stored.

The method of generating the nitrogen gas and of extinguishing fires that have started in bales of cotton or holds of vessels is as follows: The phosphorus F in receptacle E is ignited by means of the electric wires N N, a current of air being admitted at the same time into the chamber A through pipe B. A current of cold water is admitted through pipe L upon the outside of chamber A. The burning phosphorus will absorb oxygen from the air and form white fumes of phosphoric acid. These fumes being of greater specific gravity than air will fall upon the sponges or asbestos H. These sponges being saturated with water running out of the perforated pipe L over the outside surface of chamber A will absorb the fumes of the phosphoric acid. The water accumulated in tank J will dissolve the phosphoric acid and carry it through waste-pipe K. The burning phosphorus by absorbing the oxygen from the air supplied through pipe B combines with the oxygen to form phosphoric acid and liberates the nitrogen which constitutes a part of the air. The nitrogen gas being lighter than air will ascend to the upper part of chamber A and, issuing through tube D, will work its way inside and between the ignited bales to the surface, or may be conveyed by a flexible hose attached to said tube to any desired part of the vessel.

What I claim, and desire to secure by Letters Patent of the United States, is—

1. The herein-described fire-extinguishing apparatus, consisting of a tank, a chamber having a perforated bottom and an air-inlet and a gas-outlet, said chamber resting in said tank, means for holding and igniting phosphorus located in said chamber above the bottom, an absorbent resting upon said bottom, and a perforated pipe adapted to surround the chamber and supply water to the tank to moisten the absorbent.

2. The herein-described fire-extinguishing apparatus, consisting of a tank having the outlet, a chamber having a perforated bottom adapted to rest in and surrounded by said tank, means for holding phosphorus located in said chamber above the bottom, electrical connection with said means to ignite the phosphorus, a supply-pipe connected with said chamber, a water-pipe adapted to supply water to the tank, and an absorbent resting upon the bottom of the chamber.

Signed by me at New York, N. Y., this 23d day of January, 1899.

NICHOLAS A. BIBIKOV.

Witnesses:
   JAMES M. TULLY,
   FRANK H. DAVIS.